United States Patent [19]

Wing

[11] Patent Number: 4,907,926
[45] Date of Patent: Mar. 13, 1990

[54] THREAD FORM AND FASTENER SYSTEM USING THE FORM

[76] Inventor: George S. Wing, 531 Esplanade, Apt. 515, Redondo Beach, Calif. 90277

[21] Appl. No.: 892,887

[22] Filed: Jul. 29, 1986

Related U.S. Application Data

[63] Continuation of Ser. No. 702,150, Feb. 15, 1985, abandoned.

[51] Int. Cl.⁴ .......................... F16B 35/00; F16B 35/04
[52] U.S. Cl. .................................... 411/366; 411/414; 411/436
[58] Field of Search ............... 411/441, 414, 436, 427, 411/378, 423, 366, 368–370; 285/334, 355, 390; 403/307

[56] References Cited

U.S. PATENT DOCUMENTS

| | | | |
|---|---|---|---|
| 57,282 | 8/1866 | Bowers | 411/423 |
| 2,094,491 | 9/1937 | Janata | 411/427 |
| 2,207,005 | 7/1940 | Haas | 411/423 |
| 2,827,820 | 3/1958 | Vellier | 411/411 |
| 3,109,672 | 11/1963 | Franz | 411/411 |
| 3,355,192 | 11/1967 | Kloesel et al. | 411/414 |
| 3,664,540 | 5/1972 | Witkin | 411/436 |
| 4,346,920 | 8/1982 | Dailey | 411/411 |

FOREIGN PATENT DOCUMENTS

| | | | |
|---|---|---|---|
| 715294 | 12/1941 | Fed. Rep. of Germany | 411/411 |
| R15013 | 2/1956 | Fed. Rep. of Germany | 285/334 |
| 2748631 | 5/1979 | Fed. Rep. of Germany | 411/55 |
| 62683 | 7/1968 | German Democratic Rep. | 411/411 |
| 531976 | 1/1941 | United Kingdom | 411/427 |
| 2104997 | 3/1983 | United Kingdom | 411/411 |

OTHER PUBLICATIONS

WHA Robertson & Co., Ltd., *American Machinist World Screw-Thread Forms,* Jun. 1961, pp. 93 and 95; FIGS. 17A, 19, 31.

*Primary Examiner*—Neill R. Wilson
*Attorney, Agent, or Firm*—Christie, Parker & Hale

[57] ABSTRACT

A modified buttress thread has a root diameter equal to substantially $\sqrt{0.7}$ of the core diameter with a pitch substantially equal to 1/6 of the core diameter. The thread root extends parallel to the axis of the fastener as a surface and transitions into the thread form at radii at both the load-bearing and trailing flank of the thread. The thread at its maximum diameter has a flat equal to about 0.16 of the pitch. In the fastener system the axial length along a thread form of the collar at radial locations corresponding to the locations on a mating pin are inversely proportional to the strength of the materials of the collar and the pin, for example, when the collar is aluminum and the pin is titanium the lengths are in the ratio of 60:40.

20 Claims, 2 Drawing Sheets

THREAD FORM AND FASTENER SYSTEM USING THE FORM

This is a continuation of application Ser. No. 06/702,150 filed 2-15-85, now abandoned.

BACKGROUND OF THE INVENTION

The present invention relates to fasteners in general and more in particular to a modified buttress thread form for fasteners.

Threaded fasteners are, of course, well known. They consist of a male threaded element, variously known as screws, bolts, or pins, and a mating female threaded element, variously known as nut or collar; a combination of male threaded element and a female threaded element is often referred to as a "fastener system." (In this specification, a male threaded element will usually be referred to as a screw and a female threaded element will be referred to as a nut.)

Common threaded fasteners have symmetrical threads: in a plane containing the axis of the fastener, the thread is symmetrical about a radius from the axis through the major diameter of the thread. The included angle between the thread flanks us usually 60°.

Buttress threads avoid high stresses along the pressure flank of the thread in a radial direction, and have been used for that reason. A buttress thread has the pressure or load-bearing thread flank nearly perpendicular to the axis of the thread, and so the flank is not subject to high radial stresses. Typically, the pressure flank is at an angle of inclination of from about 1° to about 5° to avoid cutter interference during milling of the thread. Some inclination would be necessary to avoid dye interference in roll formed threads. Buttress threads often are used in breach assemblies of large guns, airplane propeller hubs, and columns for hydraulic presses.

The buttress thread forms I currently know have a relatively gentle sloping backside flank, typically at an angle of about 45° to a radius from the axis of the thread. The thread forms of complementary male and female threads have the same axial lengths at corresponding radii, so the axial distances at the root of both are equal and the distances across the thread crests of both are equal. Thus thread failure in the standard buttress thread always depends on the weakest material; the collar is generally the weaker material, and in extreme cases thread failure will occur at the root of the collar thread and the pin thread will not fail at all. Another difficulty with the thread forms known by me is that there is no attempt to correlate thread height with fastener diameter so that the strength performance of a thread is proportional to fastener diameter. Instead, thread height is made a linear function of the distance between sucessive threads of a fastener, the "pitch," and pitch varies somewhat arbitrarily between different fastener diameters. (Strictly, there is only one thread in a fastener, but it is common to call the successive manifestations of the single thread seen in axial cross-section "threads," these manifestations will often be called "thread forms" in this specification.

The requirements of the threaded fastener systems are stringent in sophisticated threaded fastener systems used in aerospace. An important requirement of an aerospace fastener is a known and repeatable pre-load: the clamp-up force on the sheets held together by the fastener system. This pre-load correlates directly with the torque that sets the fastener. Nonetheless, a lot of the setting torque in a typical fastener system is not used in developing pre-load but instead is used in overcoming friction. A typical 60° included angle thread experiences considerable friction between the threads of the collar and the pin because the load across the load-bearing flanks is greater than the pre-load because of the multiplying effect of the thread geometry, and accordingly driving load has to be sufficiently high to take into account the added friction in addition to the desired pre-load. The reduction of this parasitic friction has the advantages of reducing the driving load, the requirements of the setting tools, and increasing the accuracy of the pre-load. Fatigue life is critical in a fastener system for obvious reasons.

Many fastener systems have a thread lock to keep the collars from loosening on the pins. A form of thread lock uses deformed threads of the collar to increase friction between the collar and the pin threads in a localized area. Substantial hoop stress on the collar imparted through the threads of the pin can reduce or eliminate the effect of the thread lock because the hoop stress overcomes the deformation in the collar and plastically deforms the thread lock so that it looses its ability to perform its function.

SUMMARY OF THE INVENTION

The present invention provides a unique thread form having as one characteristic a constant relationship of the radial cross-sectional area of the thread with respect to the cross-sectional area at the fastener core diameter of substantially 30%.

Generally, the present invention contemplates a root diameter substantially equal to the product of the square root of 0.7 and the core diameter of the fastener, a pitch substantially equal to about 1/6 the core diameter, and a load-bearing flank at a maximum angle of inclination from a perpendicular to the axis of the threads of about 7°.

The non-loading bearing flank is preferably at an angle of inclination of about 45° from a perpendicular to the axis of the fastener. It is also preferred to have the root between the load-bearing and non-load-bearing flanks extend axially as a surface parallel to the axis of the fastener. Preferably, the present invention has a flat at the maximum thread diameter substantially equal to 0.16 the pitch with a maximum thread diameter no more than about 0.98 the core diameter.

Thus, the present invention contemplates a modified buttress thread form that provides a low radial stress in the female fastener from threaded engagement and a smaller amount of the setting torque devoted to overcoming thread friction. The thread provides uniformity in the ratio of the projection of the cross-section area of the thread onto a radial plane at the core diameter of the fastener regardless of fastener size.

The present invention also contemplates a fastener system of a male and female fastener where the resistance of both fasteners to failure in shear in the threads for loads applied in an axial direction is made substantially equal by equalizing the product of the ultimate shear strength of the male fastener ($T_m$) and the axial distance ($I_m$) along the male thread at the failure diameter of the fastener with the product of the ultimate shear strength ($I_f$) of the female fastener and the axial distance ($I_f$) along the female thread at the diameter of its failure. In a practical embodiment of the present invention, the ratio of these lengths along the female and male threads is 60:40. This relationship with typical materials used in the collars and pins provides for substantial equality in the strengths along the threads of the mating parts, for example, where the collar is made of aluminum and the pin is made of titanium.

The thread form of the present invention offers improvements over standard thread forms. Fatigue life of the fasteners is considerably better than standard "V"-shaped threads because the thread form of the invention has no notches or abrupt changes in cross-sectional area; indeed the thread root extends an an annular surface for an appreciable axial distance and there is no change in cross-sectional area here. The load-bearing flank being substantially perpendicular to the axis of the fastener results in the axial load applied to the threads being substantially the same as the total load, and as a consequence the torque required to set the fastener system is substantially less than any standard threaded configuration. This leads to at least three advantages: the driving load is reduced, the female fastener experiences markedly lower radial growth, and plastic failure of deformed threads of a thread lock is avoided. The fastener system also has a constant ratio of the thread area to the area of the fastener regardless of fastener size. This leads in smaller diameter fasteners to increased tensile strength relative to conventional "V"-shaped threads both metric and U.S.

DESCRIPTION OF THE PREFERRED EMBODIMENT

Figure 1:
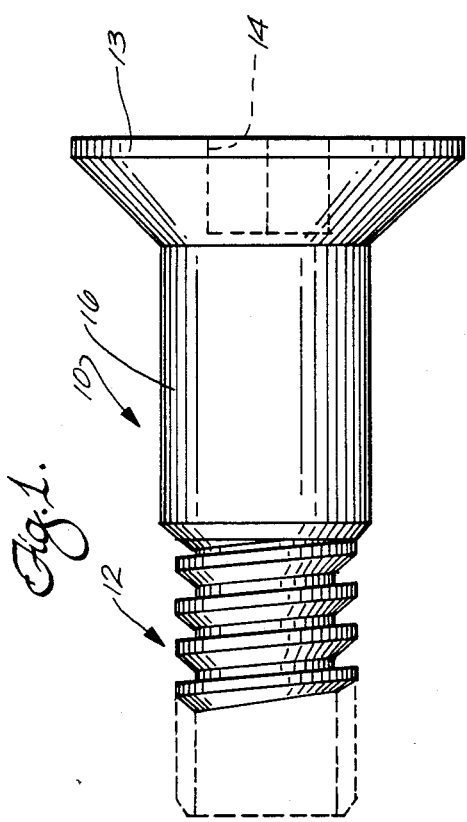
FIG. 1 shows a screw constructed with the preferred thread form of the present invention.

FIG. 1 shows a screw 10 having a thread form 12 constructed in accordance with the present invention. In general, the screw has a head 13, a wrenching recess 14 in the head, a right cylindrical shank 16 extending from the head to the thread, and the threads.

Figure 2:
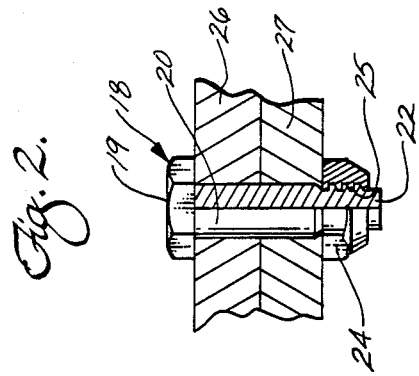
FIG. 2 shows a joint, partly in half-section, formed of a screw and nut both with the thread form of the present invention.

FIG. 2 shows a fastener system in accordance with the present invention. It includes a screw 18 that has a protruding head 19, a right cylindrical, unthreaded shank 20 and a threaded end 22. A nut 24 having threads 25 threads onto thread 22 and clamps sheets 26 and 27 between it and head 19 of the screw.

Figure 3:
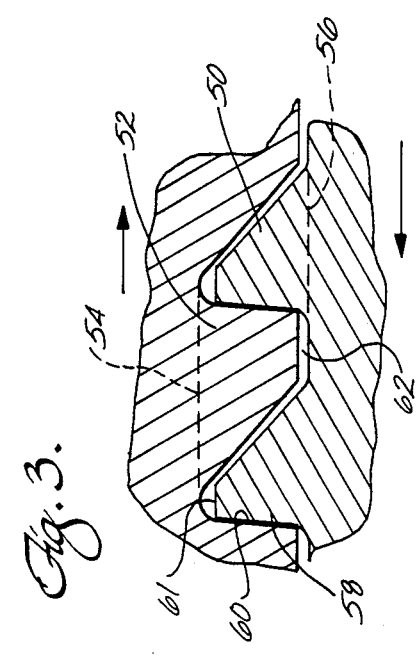
FIG. 3 is a fragmentary view in cross-section of the threaded engagement of a screw and nut, each having a thread form in accordance with the present in invention.
Figure 5:
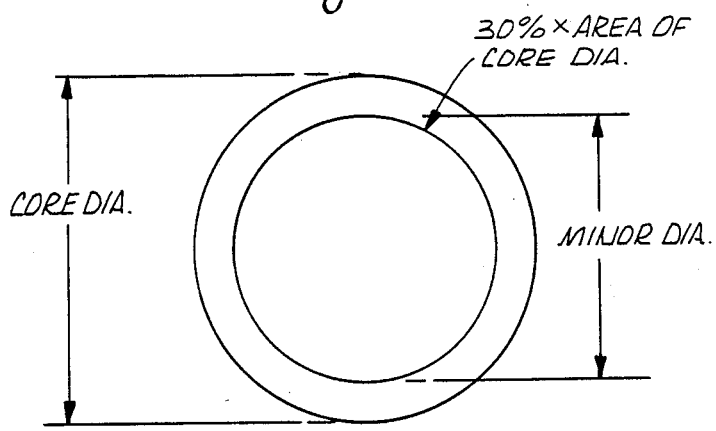
FIG. 5 shows the thread form with additional defining parameters.
Figure 4:
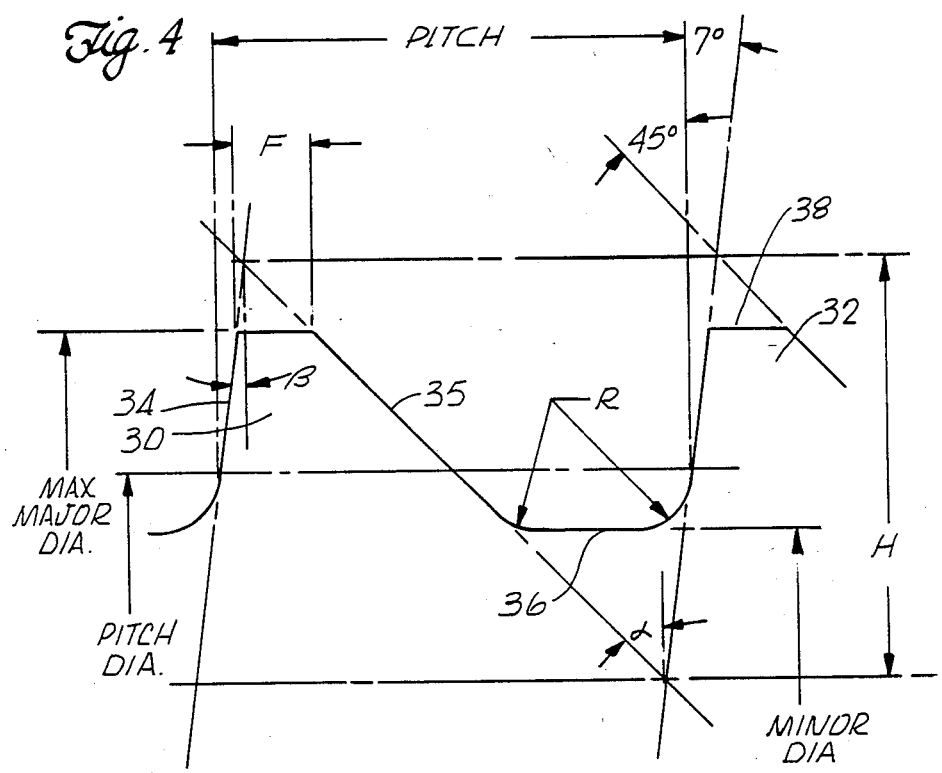
FIG. 4 shows the thread form and various defining parameters.

With reference to FIGS. 4 and 5, the parameters that define the thread form of the present invention for a screw are shown. In FIG. 4 a thread form 30 is axially adjacent a second thread form 32. A load-bearing flank 34 of thread form 30 extends almost perpendicularly to the axis of the thread and fastener. Its inclination from this perpendicular is no more than about 7° and the inclination is indicated by the angle $\beta$. A trailing or non-load-bearing flank 35 of the thread form is inclined to a perpendicular to the axis of the fastener by an angle $\alpha$, and in the preferred form angle $\alpha$ is about 45°. The minor or root diameter of the thread is labeled as such in FIG. 4. A surface 36 extends axially parallel to the axis of the thread between thread forms 30 and 32. (The thread "form" as distinguished from the "thread" means an individual protrusion from the root diameter as seen in an axial cross-section, such as shown in FIGS. 3 and 4.) The thread crest, indicated at 38, is a flat extending parallel to the axis of the thread an axial distance "F." The maximum or major diameter of the threads is the diameter of the threads at and along flat 38. Pitch is the axial distance between corresponding points of two individual thread forms. Radius "R" is the radius between the non-load-bearing and load-bearing flanks and axial surface 36. "H" is the perpendicular distance to the axis of the threads in a plane of an axial cross-section from the intersection of the lines along the leading and trailing flanks of an individual thread form to the intersection lines along a trailing flank of this thread form and leading flank of an adjacent thread form.

In the pin there is a considerable amount of material radially outward of the beginning point of "H," the material below surface 36. The presence of this material enhances the strength of the pin in both tension and fatigue because of a greater radial cross-section at the root and in fatigue because of the absence of notches and rapid changes in radial cross-sectional area.

The presence of this material below surface 36 results from the interrelationship of the parameters that will be subsequently discussed.

A characteristic of the thread form of the present invention is a relationship of areas or diameters shown in FIG. 5. In FIG. 5, the area of the pin devoted to the thread form measured as in the cross-section annulus between the minor diameter and a core diameter is equal to 30% of the area of the core diameter. In terms of diameters, this relationship is:

$D_r = \sqrt{0.7} \, D_c$, where $D_r$ is the root or minor diameter, and $D_c$ is the core diameter.

In a pin, the core diameter is the diameter at the outer radial limit of "H," that is, at the intersection of lines along the leading and trailing flanks of a thread form. "H" equal to aboutf 0.9 P.

The table that follows shows these various defining parameters for various pin sizes.

| Size | *Core Dia. ($D_c$) | Area of Core ($A_c$) | 30% Area (30% $A_c$) | Minor Dia. (d) | Pitch (P), ($D_c/6$) | Max. Maj. Thd. Dia. ($D_m$) (.9792) (Core Dia.) | "F" = .1631 × P | "H" = $\frac{P\cos\alpha\cos\beta}{\sin(\alpha + \beta)}$ | Pitch Dia. ($D_p$) | Max. R = P ×0 0.10 to .15 | Tap Drill |
|---|---|---|---|---|---|---|---|---|---|---|---|
| 5/32, *4 mm | .1575 | .01948 | .00584 | .13177 | .02625 | .1542/.1522 | .00428 | .02338 | .13846 | .0039/.0026 | .1405 |
| *3/16, 5mm | .1875 | .02761 | .00828 | .15687 | .01325 | .1836/.1811 | .00510 | .02783 | .16485 | .0047/.0031 | .1648 |
| *6mm | .2362 | .04382 | .01315 | .19762 | .03937 | .2313/.2285 | .00642 | .03506 | .20767 | .0059/.0039 | .2087 |
| *¼, 6.5 mm | .2500 | .04909 | .01473 | .20917 | .04167 | .2448/.2418 | .00680 | .03711 | .21980 | .0063/.0042 | .2205 |
| *5/16, | .3125 | .07670 | .02301 | .26146 | .05208 | .3060/.3020 | .00850 | .04638 | .27476 | .0078/.0052 | .2756 |

-continued

| Size | *Core Dia. (D_c) | Area of Core (A_c) | 30% Area (30% A_c) | Minor Dia. (d) | Pitch (P) (D_c/6) | Max. Maj. Thd. Dia. (D_m) (.9792) (Core Dia.) | "F" = .1631 × P | "H" = $\frac{P\cos\alpha\cos\beta}{\sin(\alpha+\beta)}$ | Pitch Dia. (D_p) | Max. R = P ×0 0.10 to .15 | Tap Drill |
|---|---|---|---|---|---|---|---|---|---|---|---|
| 8 mm ⅜, | .3740 | .10985 | .03296 | .31291 | .06233 | .3662/.3622 | .01017 | .05551 | .32883 | .0093/.0062 | .3307 |
| *9.5 mm *10 mm | .3937 | .12174 | .03652 | .32939 | .06562 | .3855/.3815 | .01071 | .05844 | .34615 | .0098/.0066 | .3465 |
| 7/16, *11 mm | .4331 | .14732 | .04196 | .36236 | .07281 | .4241/.4191 | .01178 | .06429 | .38078 | .0108/.0072 | .3819 |
| *12 mm | .4724 | .17527 | .05258 | .39524 | .07873 | .4626/.4576 | .01285 | .07012 | .41534 | .0118/.0079 | .4219 |
| ½, *12.5 mm | .4921 | .19019 | .05706 | .41172 | .08202 | .4819/.4769 | .01338 | .07305 | .43264 | .0123/.0082 | .4331 |
| 9/16*, 14 mm | .5512 | .23862 | .07159 | .46117 | .09187 | .5397/.4347 | .01499 | .08182 | .48462 | .0138/.0092 | .4921 |
| *⅝, 16 mm | .6250 | .30680 | .09204 | .52291 | .10417 | .6120/.6060 | .01699 | .09278 | .54948 | .0156/.0104 | .5512 |
| *18 mm | .7087 | .39447 | .11834 | .59294 | .11812 | .6940/.6880 | .01927 | .10520 | .62309 | .0177/.0118 | .6250 |
| ¾, *19 mm | .7480 | .43943 | .13183 | .62582 | .12467 | .7324/.7264 | .02034 | .11104 | .65763 | .0187/.0125 | .6594 |
| ⅞, *22 mm | .8661 | .58915 | .17675 | .72463 | .14435 | .8481/.8411 | .02355 | .12856 | .76148 | .0217/.0144 | .7656 |
| *1, | 1.0000 | .78540 | .23562 | .83666 | .16667 | .9792/.9722 | .02719 | .14844 | .87919 | .0250/.0166 | .8858 |

*Diameter upon which remaining values are determined, remaining values being in inches.

FIG. 3 illustrates in detail the relationship between the nut thread and screw thread. In the figure, the screw thread is indicated at 50 and the nut thread is indicated at 52. Nut thread 52 has a root 54; a screw thread 50 has a root 56. The distance along the nut thread at any radial point is greater than the distance along the screw thread at the corresponding radial point; for example, at roots 54 and 56. In the preferred form of the present invention, the corresponding ratios of the distances across these points are, $l_f:l_m = 60:40$, where, $l_f$ is equal to the length along the collar, and
$l_m$ is equal to the length along the pin.

In the usual aerospace application, the nut is made of material softer than the screw. By increasing the corresponding axial thickness of the nut thread with respect to the screw thread, the two can be made substantially equal in strength, thus optimizing a joint performance of the two threads in resisting axial shear along the threads, say at root 54 of the nut.

With the pitch equal to 1/6 the core diameter, and with the projected area of the male thread to the area of the core being 30%, the distance across the female flat is substantially greater than the distance along the male flat, as can be seen in FIG. 3, with the female flat being shown at 62 and the male flat being shown at 64. This is symptomatic of the greater axial length at corresponding points throughout the female thread form with respect to the axial length of the male thread form.

As can be seen in FIG. 3, loads are applied to the thread forms through the load-bearing faces of 58 and 60 of the thread forms. This type of loading corresponds to tensile loading of a fastener, and is a typical type of loading experienced in a joint such as shown in FIG. 2. There, the reaction force of the sheets 26 to 27 to the clamp-up load on them placed by head 19 and nut 24 is a tensile force applied to the screw and to the threads of the nut. The trailing flanks of the thread forms bear no load at all, and a clearance exists between these flanks. In the aerospace industry, this clearance corresponds to a Type 3 fit, and that is the preferred fit for the fastener system of this invention. The loading along the load-bearing flanks of the threads is essentially axial with no radial component. Accordingly, the nut has no material hoop stress in it resulting from this loading. This means that the nut will not expand because of hoop stress with the result that a nut can be made comparatively lightweight without the loss of the thread lock function of deformed threads; the nut threads not experiencing material hoop stress cannot fail plastically and destroy the acircular thread form required for of many thread locks.

Another significant advantage of load transmission through substantially vertical faces of cooperating thread forms is a reduction in the setting torque. A "V"-type thread form has a considerably greater load between the engaged flanks of the thread than does the thread of the present invention, with this greater loading there is a corresponding increase in friction. This friction must be overcome in setting the fastener system with the result that the drive load is higher in a fastener with a "V"-shaped thread form than one with the modified buttress thread form of this invention.

Stated differently, in the thread form of the present invention, the load along the axis of the fastener with the thread form corresponds essentially to the load applied to the sheets. In a conventional "V"-form fastener having a 60° included angle, the load imposed by a given axial load that produces friction between the thread form is proportional to the axial load divided by the Sine of 60°. The radial stress is proportional to the axial stress times the Cotangent of 60°.

The angle of the load flank of the thread to the perpendicular is preferably no greater than about 7°, and preferably less. There must be some angle to the perpendicular to accommodate thread roll dies. The angle of the non-load-bearing flank to the perpendicular from the axis of the thread is preferably 45°, but it may be a little less for the screw if more material is desired in the female thread form to compensate for a greater strength in the male thread form.

The provision of axially extending surface 36 at the root of the thread means that a good sized radii, "R," between the surface and the leading and trailing flanks is possible. With the large radii goes improved fatigue strength. The flat at 38 is dictated by the provision of more material across the root diameter of the female fastener than would otherwise be possible. In short, by not having the male thread form go to a point, it is possible to increase the root diameter of the female thread, and that is done.

The present invention has been described with reference to a preferred embodiment. The spirit and scope of the present invention should not, however, necessarily be limited to this description.

What I claim is:

1. In a threaded fastener with a buttress type thread which has a load bearing flank and a non-load-bearing flank, an improvement in the thread which comprises:
   (a) $D_R$ being substantially equal to $\sqrt{0.7} \, D_c$,
   (b) P being substantially equal to $1/6 \, D_c$, and
   (c) the load-bearing-flank being at a maximum angle of inclination of about 7° from the perpendicular to the axis of the fasteners, where
   $D_R$ = root diameter of the thread,
   $D_c$ = core diameter of the fastener, and
   P = the pitch of the thread.

2. The improvement claimed in claim 1 wherein the root of the thread extends axially as a surface parallel to the axis of the fastener.

3. The improvement claimed in claim 1 wherein the non-load-bearing flank is at an angle of inclination of about 45° from the perpendicular to the axis of the fastener.

4. The improvement claimed in claim 1 wherein the maximum thread diameter is no more than about 0.98 $D_c$ and the thread has a flat at the maximum thread diameter of about 0.16 P.

5. The improvement claimed in claim 1 including a radius between the load-bearing flank and the root and between the non-loading-bearing flank and the root, each of the radii being between about 0.1 P and 0.15 P.

6. The improvement claimed in claim 3 wherein the maximum thread diameter is no more than about 0.98 $D_c$ and the thread has a flat at the maximum thread diameter of about 0.16 P.

7. The improvement claimed in claim 6 including a radius between the load-bearing flank and the root and between the non-load-bearing flank and the root, each of the radii being between about 0.1 P and 0.15 P.

8. In a threaded fastener combination of a male fastener and a female fastener both with a buttress type thread, an improvement in the thread form of both the male and female fasteners comprising substantially equal strength of both fasteners in resistance to failure in shear in the thread of each at the root diameter of each from loads in the axial direction by substantial equalization of the following relationship $$\tau_m \, l_m = \tau_f \, l_f$$

where,
$\tau_m$ = ultimate shear strength of the male thread fastener,
$l_m$ = axial distance along the male thread at the diameter of its failure in shear in the axial direction,
$\tau_f$ = ultimate shear strength of the female fastener thread, and
$l_f$ = axial distance along the female thread at its diameter of failure in shear in the axial direction.

9. The improvement claimed in claim 8 wherein $l_f : l_m$ is substantially equal to 60:40.

10. The improvement claimed in claim 9 wherein the female fastener is formed from softer material than the male and $\tau_m : \tau_f$ is substantially equal to 60:40.

11. The improvement claimed in claim 10 wherein the male fastener is formed from a stronger material than the female.

12. The improvement claimed in claim 8 wherein the threads of each of the fasteners has a load-bearing flank and a non-load-bearing flank, and
   (a) $D_R$ is substantially equal to $\sqrt{0.7} \, D_c$,
   (b) P is substantially equal to $1/6 \, D_c$, and
   (c) the load-bearing flank is at a maximum angle of inclination of about 7° from the perpendicular to the axis of the fastener, where
   $D_R$ = root diameter of the thread of each fastener.
   $D_c$ = core diameter of the fasteners, and
   P = the pitch of the thread of the fasteners.

13. The improvement claimed in claim 12 wherein the maximum thread diameter for both threads is no more than about 0.98 $D_c$ and the threads each have a flat at their maximum thread diameter of about 0.16 P.

14. The improvement claimed in claim 13 wherein the non-load-bearing flank is at an angle of inclination of about 45° from the perpendicular to the axis of each of the fasteners.

15. The improvement claimed in claim 14 wherein each of the fasteners includes a radius between its load-bearing flank and its root and between its non-load-bearing flank and its root, the radius being between about 0.1 P and 0.15 P.

16. In a threaded fastener with a buttress type thread which has a load-bearing flank and a non-load-bearing flank, an improvement in the thread form comprising:
   (a) $D_R$ being substantially equal to $\sqrt{0.7} \, D_c$,
   (b) P being substantially equal to $1/6 \, D_c$, and
   H = to about 0.9 P, where
   $D_R$ = root diameter of the thread,
   $D_c$ = core diameter of the fastener,
   P = the pitch of the thread, and
   H = the distance as seen in axial cross-section of a radius to the axis of the fastener from the intersection of lines drawn along the load-bearing and non-load-bearing flanks of an individual thread form to the intersection of lines drawn along the non-load-bearing flank of a preceeding thread form and the load-bearing flank of the individual thread form.

17. The improvement claimed in claim 16 wherein the load-bearing flank is at a maximum angle of inclination of about 7° from a radius of the fastener and the non-load-bearing flank at an angle of about 45° from a radius of the fastener.

18. The improvement claimed in claim 17 wherein the maximum thread diameter is no more than about 0.98 $D_c$ and the thread has a flat at the maximum thread diameter of about 0.16 P.

19. The improvement claimed in claim 18 including a radius between the load-bearing flank and the root and between the non-load-bearing flank and the root.

20. The improvement claimed in claim 19 wherein each of the radii is between about 0.1 P and 0.15 P.

* * * * *